R. N. Meriam,
Cutter Arm for Planing Machs.
N° 44,333. Patented Sep. 20. 1864.
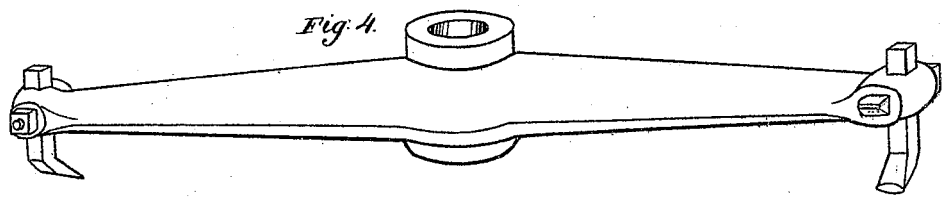
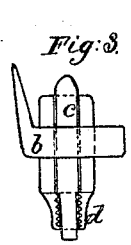
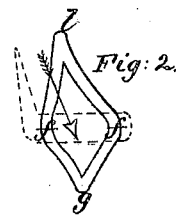
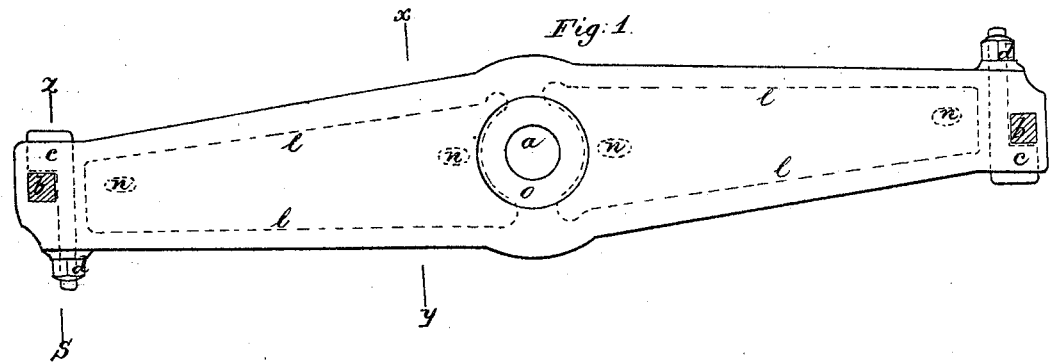
Witnesses;
H. A. Richardson
Wm B. McIver
Inventor;
Rufus N. Meriam

UNITED STATES PATENT OFFICE.

RUFUS N. MERIAM, OF WORCESTER, MASSACHUSETTS.

IMPROVEMENT IN CUTTER-ARMS FOR PLANING-MACHINES.

Specification forming part of Letters Patent No. 44,333, dated September 20, 1864.

*To all whom it may concern:*

Be it known that I, RUFUS N. MERIAM, of the city and county of Worcester, and State of Massachusetts, have invented certain new and useful Improvements in Cutter-Arms for Daniel's Planing-Machines; and I do hereby declare that the following is a full, clear, and exact description of the construction and operation of the same, reference being had to the annexed drawings, making a part of this description, in which—

Figure 1 is a top view. Fig. 2 is a section through $xy$, Fig. 1. Fig. 3 is a section through $rs$, Fig 1; and Fig. 4 is a perspective view, the same letters referring to the same parts in all.

The arm is made of malleable iron cast hollow, as shown in Fig. 2, and also by the dotted lines $l l l l$, Fig. 1, the core being supported at the oval openings $n n n n$, having its axis, on which it rotates, in the center, surrounded by a continuous ring $o$. $b b$ are the cutters. $c c$ are hooks for holding the cutters in place, on which there are screws and nuts $d d$. To secure the cutters, holes are made perpendicularly through the extreme ends of the arm in which the cutters $b b$ are inserted. There are also holes through at right angles with the cutter-holes, in which the hooks $c c$ are placed and drawn against the cutters by the nuts $d d$.

The forward edge of the arm $e$, Fig. 2, is nearly sharp, and gradually increases in thickness, with first a concave and then a convex circle, to $ff$, and then rounds over to $g$, in such form as will most easily pass through the air and leave no vaccum back of it when moving rapidly forward.

The strain on the arm when working is in the direction of the arrow, Fig. 2. Thus it follows that the form of the arm and position of the cutters are such that it has the greatest strength through that direction in which it is required to resist the strain, at the same time that which will pass through the air with the least resistance. The ends where the cutters are fastened with the hooks are in like manner so formed as to meet with little resistance from the air, and add to the rigidity of the arm.

The cutters are secured to the arm much nearer the ends (see Figs. 1 and 4) than they can be by the usual method of the eyebolt, consequently planing some three inches wider on the same width machine than those heretofore used; are less liable to accident from colliding with the dogs or holdfasts to secure the lumber while being planed; and in case the cutters should break, as frequently happens, the hook-bolts cannot fly out.

I am aware that oval hollow arms have been used, the hollow extending into and around the central eye, $a$, forming a section instead of a continuous ring. This I do not claim.

What constitutes the characteristic features of my invention are, the form of the arm being such as will pass through the air with the least resistance, and at the same time give the greatest strength through that direction in which it is required to resist the strain, combined with the position of the cutters; forming the ends so as to meet with but little resistance from the air, while it adds to the strength; supporting the core so as not to cut into the central eye, for the purpose of more accurately fitting it to the spindle on which it rotates, and the method of fastening the cutters at the extreme ends of the arm, to plane wider than by the old method and with greater safety to the operator.

Thus, having fully described the construction and operation of my arm, what I claim as new, and desire to secure by Letters Patent, is—.

The described method of fastening the cutters, substantially as and for the purpose herein specified.

RUFUS N. MERIAM.

Witnesses:
H. A. RICHARDSON,
WM. B. McIVER.